United States Patent
Rilling

(12) 
(10) Patent No.: US 9,154,213 B2
(45) Date of Patent: *Oct. 6, 2015

(54) INTERFERENCE REDUCTION FOR MULTIPLE SIGNALS

(71) Applicant: Kenneth F. Rilling, Cupertino, CA (US)

(72) Inventor: Kenneth F. Rilling, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/616,722

(22) Filed: Feb. 8, 2015

(65) Prior Publication Data

US 2015/0155897 A1    Jun. 4, 2015

Related U.S. Application Data

(60) Continuation of application No. 14/590,887, filed on Jan. 6, 2015, which is a continuation of application No. 14/296,203, filed on Jun. 4, 2014, now Pat. No. 9,054,768, which is a continuation of application No.

(Continued)

(51) Int. Cl.
| | |
|---|---|
| H04L 27/00 | (2006.01) |
| H04B 7/08 | (2006.01) |
| H04B 1/10 | (2006.01) |
| H04L 25/03 | (2006.01) |

(Continued)

(52) U.S. Cl.
CPC .................. *H04B 7/086* (2013.01); *H04B 1/10* (2013.01); *H04B 1/1081* (2013.01); *H04B 7/0848* (2013.01); *H04B 7/0851* (2013.01); *H04B 7/0862* (2013.01); *H04L 25/03025* (2013.01); *H04L 25/03885* (2013.01); *H04L 27/2649* (2013.01); *H04L 27/38* (2013.01)

(58) Field of Classification Search
CPC .. H04B 1/7097; H04B 7/0845; H04B 1/1081; H04B 7/0848; H04L 25/03019; H04L 25/03025
USPC .......... 375/142–144, 147–148, 152, 229, 232, 375/348–350, 260, 299
See application file for complete search history.

(56) References Cited

U.S. PATENT DOCUMENTS

| | | |
|---|---|---|
| 4,736,460 A | 4/1988 | Rilling |
| 4,752,969 A | 6/1988 | Rilling |
| 4,797,950 A | 1/1989 | Rilling |

(Continued)

OTHER PUBLICATIONS

Vook, Fred W., and Baum, Kevin L, Adaptive Antennas for OFDM, 48th IEEE Vehicular Technology Conference, May 18-21, 1998, pp. 660-610. USA.

(Continued)

*Primary Examiner* — Emmanuel Bayard

(57) ABSTRACT

The present invention reduces the degradation in performance of one or more radio signals that are co-transmitted with a first radio signal from the same transmitting antenna in the same frequency channel and received by the same antenna due to multipath or other shared interference, where the one or more radio signals can be separated from the first radio signal. All received signals are coupled to the same adaptive array or adaptive filter to reduce multipath or other shared interference of the first radio signal, which reduces multipath and other shared interference in the other radio signals before they are separated and processed by their respective receivers, or the individual radio signals are separated before the first signal enters the adaptive array and coupled to a slave weighting network slaved to the weights of the adaptive array of the first signal to reduce interference in all the signals.

20 Claims, 13 Drawing Sheets

Related U.S. Application Data

14/269,169, filed on May 4, 2014, now Pat. No. 8,923,381, which is a continuation of application No. 14/033,085, filed on Sep. 20, 2013, now Pat. No. 8,755,761, which is a continuation of application No. 13/669,426, filed on Nov. 5, 2012, now Pat. No. 8,583,068, which is a continuation of application No. 13/227,313, filed on Sep. 7, 2011, now Pat. No. 8,311,505, which is a division of application No. 12/380,709, filed on Mar. 3, 2009, now Pat. No. 8,019,305, which is a division of application No. 11/453,785, filed on Jun. 15, 2006, now Pat. No. 7,519,346, which is a continuation of application No. 10/405,010, filed on Mar. 30, 2003, now Pat. No. 7,076,228, which is a continuation-in-part of application No. 09/438,132, filed on Nov. 10, 1999, now Pat. No. 6,564,044.

(60) Provisional application No. 60/108,663, filed on Nov. 16, 1998.

(51) Int. Cl.
  *H04L 27/26* (2006.01)
  *H04L 27/38* (2006.01)

(56) References Cited

U.S. PATENT DOCUMENTS

| | | | | |
|---|---|---|---|---|
| 5,202,903 | A * | 4/1993 | Okanoue | H04B 7/0845 375/341 |
| 5,598,428 | A * | 1/1997 | Sato | H04B 1/7097 370/342 |
| 5,608,409 | A | 3/1997 | Rilling | |
| 5,982,327 | A | 11/1999 | Vook et al. | |
| 6,087,986 | A | 7/2000 | Shoki et al. | |
| 6,115,426 | A | 9/2000 | Fujimoto et al. | |
| 6,185,258 | B1 | 2/2001 | Alamouti et al. | |
| 6,317,466 | B1 | 11/2001 | Foschini et al. | |
| 6,452,981 | B1 | 9/2002 | Raleigh et al. | |
| 6,600,776 | B1 | 7/2003 | Alamouti et al. | |
| 8,583,068 | B2 * | 11/2013 | Rilling | 455/278.1 |
| 8,755,761 | B1 * | 6/2014 | Rilling | 455/278.1 |
| 2005/0053164 | A1 | 3/2005 | Catreux et al. | |
| 2005/0053170 | A1 | 3/2005 | Catreux et al. | |
| 2005/0074080 | A1 | 4/2005 | Catreux et al. | |
| 2005/0105632 | A1 | 5/2005 | Catreux et al. | |
| 2005/0141630 | A1 | 6/2005 | Catreux et al. | |
| 2006/0029146 | A1 | 2/2006 | Catreux et al. | |
| 2006/0072499 | A1 | 4/2006 | Kent et al. | |
| 2006/0072511 | A1 | 4/2006 | Kent et al. | |
| 2006/0072682 | A1 | 4/2006 | Kent et al. | |
| 2006/0072683 | A1 | 4/2006 | Kent et al. | |
| 2006/0072690 | A1 | 4/2006 | Kent et al. | |
| 2006/0083202 | A1 | 4/2006 | Kent et al. | |

OTHER PUBLICATIONS

Sanada, Yukitoshi, Padilla, Micheal, and Araki, Kiyomichi, Performance of Adaptive Array Antennas with Multicarlier DS/CDMA in a Mobile Fading Environment, IEICE Trans. Commun., vol. E81-B, No. 7, Jul. 1998, pp. 1392-1400. Japan.

Raleigh, Gregory, G., and Jones, V.K., Multivariate Modulation and Coding for Wireless Communications, IEEE Journal on Selected Areas in Communications. vol. 17, No. 5, May 1999, pp. 851-866. USA.

Widrow, B., et al, Adaptive Antenna Systems, Proceedings of the IEEE, vol. 55, No. 12, Dec. 1967, pp. 2143-2159. USA.

Mitoshi Fujimoto, Kunitoshi Nishikawa, Tsuytayuki Shibata, Nobuyoshi Kikuma, Naoki Inagaki, A Novel Adaptive Array Utilizing Frequency Characteristics of Multi-Carrier Signals, IECE Trans. Commun. vol.E83-B, No. 2, Feb. 2000, pp. 371-379. Japan.

Okada, Minoru and Komadi, Show, Pre-DFT Combining Space Diversity Assisted COFM, IEEE Transactions on Vehicular Technology, vol. 50, No. 2 , Mar. 2001, pp. 487-496. USA.

Buudsabathon, Montree, Hara, Yoshitaka and Hara, Shinsuke, Optimum Beamforming for Pre-FFT OFDM Adaptive Antenna Array, IEEE Transactions on Vehicular Technology, vol. 53, No. 4 , Jul. 2004, pp. 945-955. USA.

Bartolome, Diego and Perez-Neira, Ana I, Pre- and Post-FFT SIMO Array Techniques in Hiperlan/2 Environments, Vehicular Technology Conference, 2002. VTC Spring 2002. IEEE 55th vol. 3, pp. 1140-1144. USA.

Bartolome, Diego and Perez-Neira, Ana, MMSE Techniques for Space Diversity Receivers in OFDM-Based Wireless LANs, IEEE Journal on Selected Areas in Communications, vol. 21, No. 2, Feb. 2003, pp. 151-160. USA.

Sun, Y. and Matsuoka, H, A Novel Adaptive Antenna Architecture—Subcarrier Clustering for High-Speed OFDM Systems in Presence of Rich Co-channel Interference, Vehicular Technology Conference, 2002. VTC Spring 2002. IEEE 55th, vol. 3, pp. 1564-1568. USA.

Moric, Stipe and Adve, Raviraj, Sub-CarrierBased Weight Techniques for OFDM systems, http://www.comm.toronto.eduksadve/Publications/Stipe_Queens2004summaryFinal.pdf. downloaded on Jul. 26, 2006. Canada.

Treichler, John R., Johnson, C. Richard Jr., and Larimore, Micheal G., Theory and Design of Adaptive Filters, John Wiley & Sons, New York, 1987, pp. 73-228.

Monzingo, Robert A. and Miller, Thomas W., Introduction to Adaptive Arrays, John Wiley & Sons, New York, 1980, pp. 155-480.

Compton, R.T. Jr., Adaptive Antenna Concepts and Performance, Prentice Hall, Englewood Cliffs, NJ, 1988, pp. 7-431.

Alamouti, Siavash M., A Simple Transmit Diversity Technique for Wireless Communications, IEEE Journal on Selected Areas in Communications, vol. 16, No. 8, Oct. 1998, pp. 1451-1458.

Cahan, S., et al., Impact of Transmit Antenna Spacing on 2x1 Alamouti Radio Transmission, Electronic Letters, Feb. 15, 2007, vol. 43, No. 4.

* cited by examiner

INTERFERENCE REDUCTION FOR MULTIPLE SIGNALS

CROSS-REFERENCE

This application is a continuation of U.S. application Ser. No. 14/590,887, filed Jan. 6, 2015, which is a continuation of U.S. application Ser. No. 14/296,203, filed Jun. 4, 2014, which is a continuation of U.S. application Ser. No. 14/269,169 (U.S. Pat. No. 8,923,381), filed May 4, 2014, which is a continuation of U.S. application Ser. No. 14/033,085 (U.S. Pat. No. 8,755,761), filed Sep. 20, 2013, which is a continuation of U.S. application Ser. No. 13/669,426 (U.S. Pat. No. 8,583,068), filed Nov. 5, 2012, which is a continuation of U.S. application Ser. No. 13/227,313 (U.S. Pat. No. 8,311,505), filed Sep. 7, 2011, which is a division of U.S. application Ser. No. 12/380,709 (U.S. Pat. No. 8,019,305), filed Mar. 3, 2009, which is a division of U.S. application Ser. No. 11/453,785 (U.S. Pat. No. 7,519,346), filed Jun. 15, 2006, which is a continuation of U.S. application Ser. No. 10/405,010 (U.S. Pat. No. 7,076,228), filed Mar. 30, 2003, which is a continuation-in-part of U.S. application Ser. No. 09/438,132 (U.S. Pat. No. 6,564,044), filed Nov. 10, 1999, which claims priority to U.S. provisional application No. 60/108,663, filed Nov. 16, 1998, and the entire contents of each of the above listed applications are incorporated herein by reference.

BACKGROUND OF THE INVENTION

1. Field of the Invention

The present invention relates to the use of an adaptive array in radio communications and in particular to improve the performance of communications and broadcast systems that incorporate multiple signals.

2. Description of the Prior Art

To obtain high quality reception, communications receivers require a signal that is uncorrupted by interference, such as multipath, adjacent channel or co-channel. One source of interference that can severely degrade reception is multipath. Multipath occurs when the transmitted signal arrives at the receiver's antenna over different propagation paths resulting in different time delays and phase shifts. The multiple paths are generally due to reflections of the transmitted signal from hills, buildings, etc. and can also be the result of atmospheric phenomena. Multipath can cause distortion in the amplitude, phase and frequency of the received signal, which can result in deep signal strength fades, frequency selective fades, intersymbol interference, noise, etc.

The same transmitting antenna can be used for the transmission of two radio communications signals at the same time in the same frequency channel. At the receiving end, the two radio communications signals can be received by the same receiving antenna at the same time before being coupled to their individual receivers. Both radio signals can suffer from interference (multipath and/or other shared interference) problems and require that the interference be reduced to improve reception.

Two approaches, well known in the art for reducing the effects of multipath and other interference, are the adaptive array and adaptive filter (see for example Widrow, B. & others, "Adaptive Antenna Systems", Proceedings of the IEEE, Vol. 55, No. 12, December 1967, pp. 2143-2159; Treichler, John R., Johnson, C. Richard Jr., and Larimore, Micheal G., *Theory and Design of Adaptive Filters*, John Wiley & Sons, New York, 1987; Monzingo, Robert A. and Miller, Thomas W., *Introduction to Adaptive Arrays*, John Wiley & Sons, New York, 1980; Compton, R. T. Jr., *Adaptive Antenna Concepts and Performance*, Prentice Hall, Englewood Cliffs, N.J., 1988; U.S. Pat. Nos. 4,736,460 and 4,752,969 by Kenneth Rilling, and others). When multiple signals are present, the use of an adaptive array or adaptive filter for each signal can be expensive, complicated and occupy too much space. For some signals, a dedicated adaptive array or adaptive filter may not provide enough performance improvement if the signal structure or available information does not lend itself to the use of an adaptive array or adaptive filter.

SUMMARY OF INVENTION

The present invention reduces the degradation in performance of one or more radio signals that are co-transmitted with a first radio signal from the same transmitting antenna in the same frequency channel and received by the same antenna, due to multipath or other shared interference, where the one or more radio signals can be separated from the first radio signal. All received signals are coupled to the same adaptive array or adaptive filter to reduce multipath or other shared interference of the first radio signal, which reduces multipath and other interference in the other radio signals before they are separated and processed by their respective receivers, or the individual signals are separated before the first signal enters the adaptive array or adaptive filter and each of the other signals coupled to an individual associated adaptive array or adaptive filter slave weighting network with weights slaved to the weights of the adaptive array or adaptive filter of the first signal to reduce the multipath and other shared interference in all the signals.

DETAILED DESCRIPTION OF THE PRESENT INVENTION

The purpose of the present invention is to use one adaptive array to improve the performance of two receivers by reducing interference (multipath or other interference that is shared) when the two radio signals occupy the same frequency channel, are transmitted from same antenna, received by the same antenna or antenna array, and are separable. In the present invention, interference other than multipath means interference shared by both radio signals.

Figure 1:
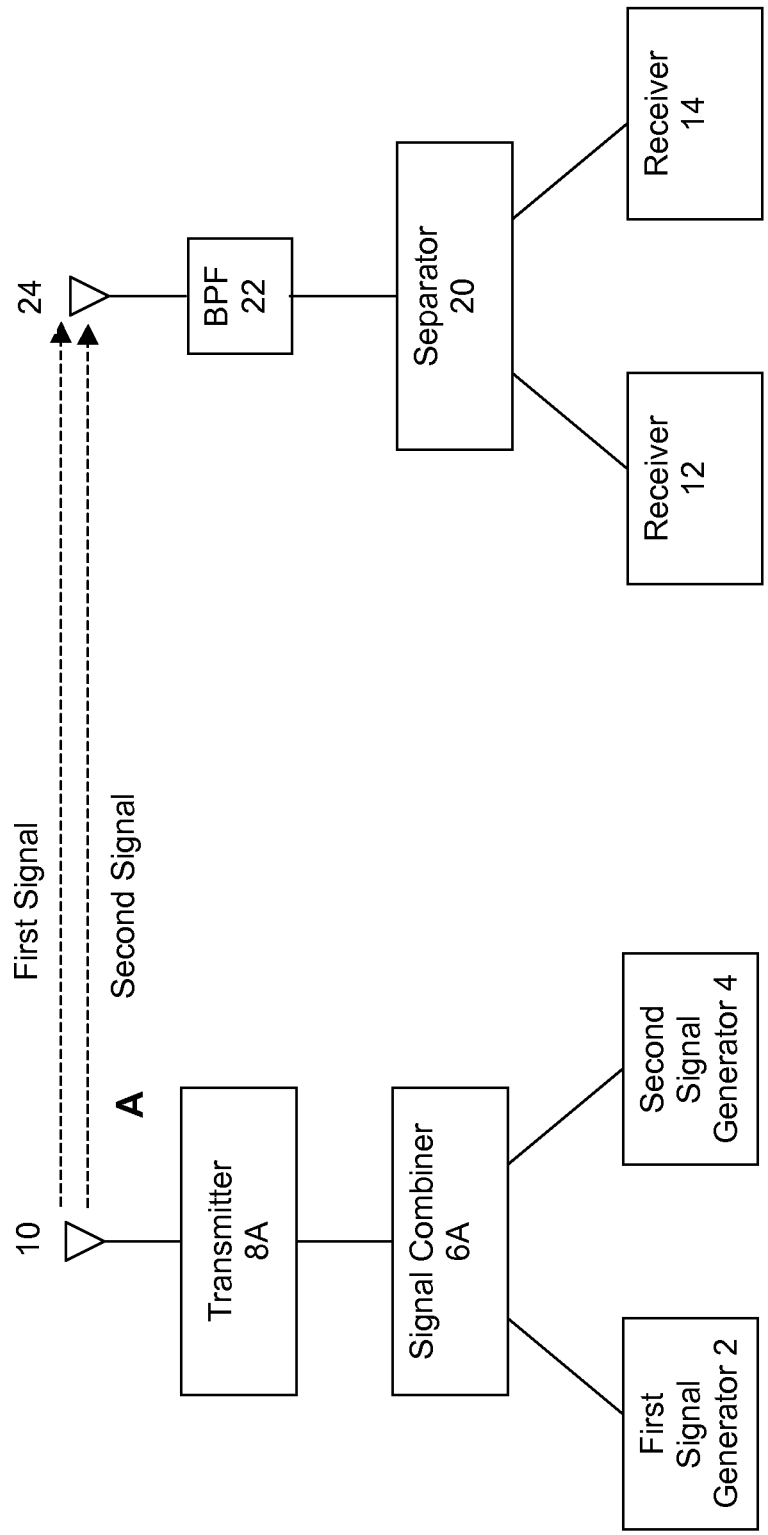
FIG. 1 shows the prior art simultaneous transmission and reception of two signals without multipath present.

FIG. 1 shows a prior art diagram of the transmission, propagation A, and reception of first and second radio signals. They use the same transmitter 8A, transmit antenna 10 and receive antenna 24, and occupy the same frequency channel. The signals are generated by the first signal generator 2 and second signal generator 4 and coupled to the inputs of signal combiner 6A. The two signals are combined by combiner 6A in a manner that permits their separation at the receiver (discussed below). They are transmitted by the same transmitter 8A using the same antenna 10, which gives them the same polarization. They also travel over the same propagation path A and are received by the same antenna 24. Bandpass filter 22 selects the frequency channel. If the bandwidths of the two signals are not so different as to cause significant frequency dependent propagation or antenna changes, the signals are received with the same relative characteristics relative to each other with which they were transmitted. The separator 20 at the receiving antenna can then separate the signals and the respective receivers 12 and 14 each receive the appropriate signal. For certain types of signals and conditions, the separator 20 may be implicitly included in the receivers, as discussed below.

Since the adaptive array can be implemented at baseband, IF or RF, the term "receiver" refers to the demodulator and receiver output, or the IF, demodulator and receiver output and/or one or RF components (i.e. mixer, bandpass filter, or pre-amp) after the adaptive array, as is appropriate.

Figure 12:
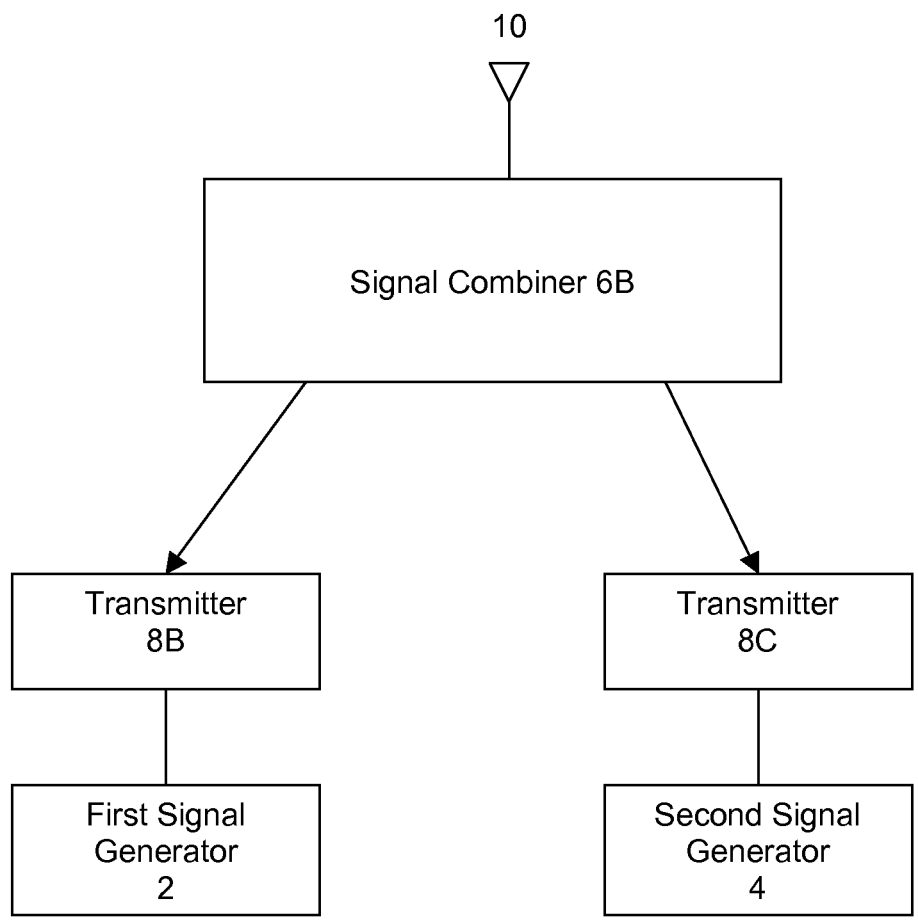
FIG. 12 shows the prior art simultaneous transmission side using separate transmitters for first and second signals before combining.

FIG. 12 shows the prior art block diagram of the transmission side which functions like the transmission side in FIG. 1 except that the first signal and second signal use separate transmitters 8B and 8C, respectively, before being combined by combiner 6B. The output of combiner 6B is coupled to antenna 10. For the present invention, antenna 10 can be replaced by a dedicated antenna for each transmitter if the antennas locations and characteristics do not significantly change the path and relative characteristics of the direct path signals or the indirect path signals (discussed below).

Figure 2:
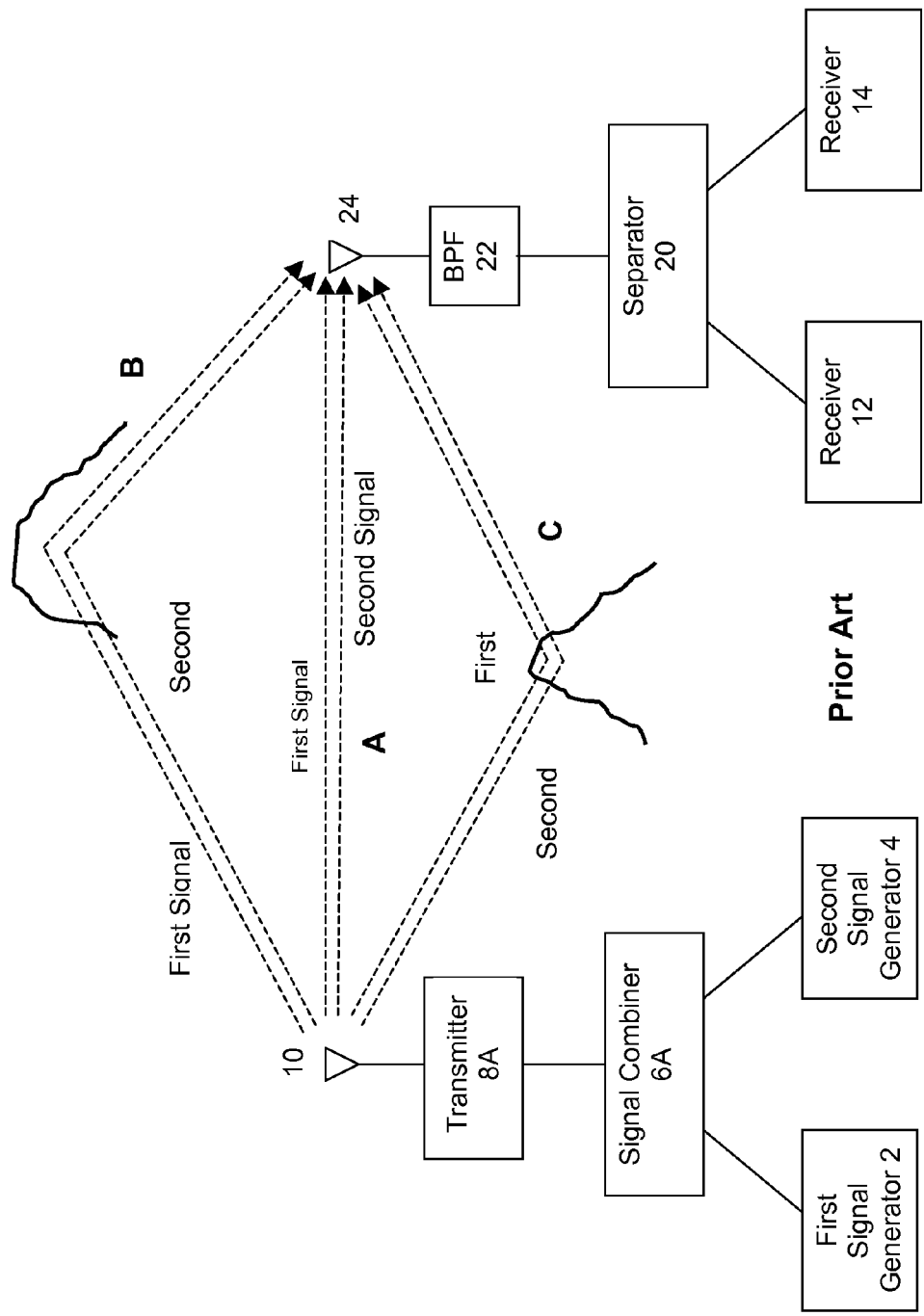
FIG. 2 shows the prior art simultaneous transmission and reception of two signals with multipath present.

FIG. 2 is a prior art diagram of FIG. 1 with multipath. It is the same transmit and receive configuration as shown in FIG. 1, except that multipath is part of the propagation path. FIG. 2 functions in the same manner as FIG. 1 except the receiving antenna 24 receives first and second signal pairs arriving from different directions following paths A, B, and C. Since the first and second signal pairs are transmitted at the same time from the same antenna 10 and received by the same antenna 24, they will have the same polarization, the same propagation paths A, B, C, and the same changes due to reflections in paths B and C. When the receiving antenna 24 collects all the multipath components, the characteristics of each pair are preserved as if they were transmitted alone (to the first approximation). The signals are then to be separated by separator 20.

Figure 3:
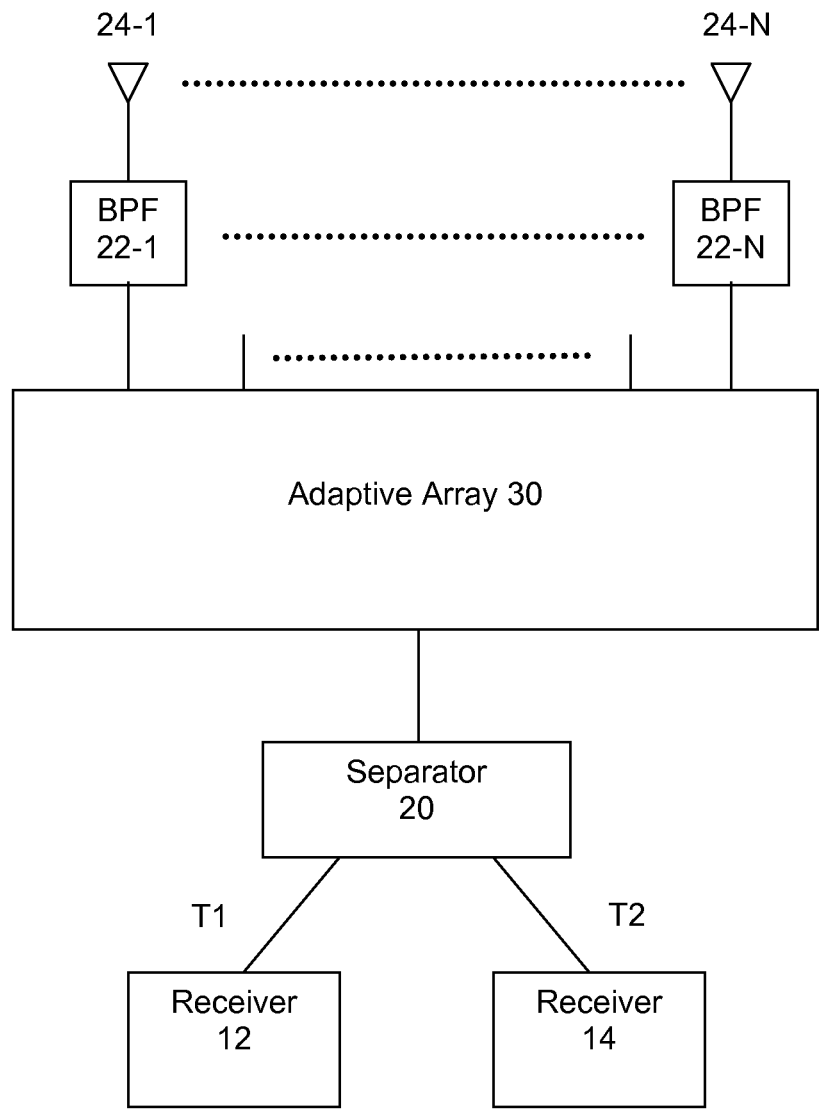
FIG. 3 is a block diagram of the receiving end with an adaptive array that reduces multipath in the first and second received signals.

For the case where the first signal is much stronger than the second signal, FIG. 3 shows a diagram of the receiving end with an adaptive array. Both the first and second signals with the associated multipath components are received by the antenna elements 24-1 to 24-N. Each element of antenna 24 is individually coupled to the input terminal of the associated one of bandpass filter 22-x. The output terminal of each bandpass filter 22-x is individually coupled to the associated one of the input terminals of the adaptive array 30. Adaptive array 30 reduces the multipath or other interference present in the received signals for that specific communications system application.

The output terminal of the adaptive array 30 is then coupled to the input terminal of the separator 20, which separates the first and second signals. Separator 20 is discussed below. Output terminals T1 and T2 of the separator 20 are coupled respectively to the input terminal of receiver 12 and receiver 14 to receive the first and second signals respectively.

In some proposed broadcast systems, as discussed below, the first signal is much stronger than the second signal. In FIG. 3, the first signal is much strong than the second signal, so that the adaptive array 30 responds primarily to the first signal, which controls the adjustments of the weights of adaptive array 30 to reject multipath in the first signal. Adaptive array 30 is designed to respond to the first signal and its available information (discussed below). The second signal will be subjected to the same weights as the first signal. Since both signals have the same multipath components, multipath of the second signal will also be rejected. To use an antenna pattern description, the antenna pattern formed by adaptive array 30 to reduce the multipath of the first signal is also the antenna pattern required to reduce multipath of the second signal because they have similar multipath components. The output signal of the adaptive array 30 is separated into the first and second signals by the signal separator 20. Receiver 12 receives the first signal and receiver 14 receives the second signal. The performance of both receivers 12 and 14 are increased by the reduction of multipath and other interference.

In this way the first signal and adaptive array 30 are used to reduce multipath in the second signal. This provides the advantages of using only one antenna array and one adaptive array, which reduces costs, number of parts/functions, and space requirements. In cases where the information available for the second signal is inadequate or the signal characteristics do not permit adequate improvement in the second signal by a dedicated adaptive array, FIG. 3 provides the advantage of better receiver performance for the second signal. In general, as a desired signal gets weaker, the performance of the adaptive array in rejecting interference becomes poorer, particularly as the signal strength approaches the reception threshold. FIG. 3 has the advantage for the second signal in weak signal conditions that the adaptive array for stronger first signal can provide better interference reduction. FIG. 3 is a basic embodiment of the present invention.

The first and second signals received by the system of FIG. 3 do not necessarily have to occupy the same frequency space. They just need to be in the same frequency channel, as defined by bandpass filter 22 for the present embodiment of the invention to function. It is not necessary for the second signal to occupy the whole channel bandwidth symmetrically about the center frequency of the channel for the present invention to function. For purposes of the present invention, frequency channel refers to the band occupied by all the significant frequency components defined by the energy mask(s) for that communications or broadcast system.

When an interference signal other than multipath is received by antenna array 24 in FIG. 3, adaptive array 30 can remove the interference. If the second signal requires a CMA (constant modulus algorithm) type standalone adaptive array, an interference signal larger than the desired signal would capture that CMA adaptive array. The present invention can reduce the effects of an interference signal that is stronger than the second signal without the capture problem.

FIG. 3 is only one example of the present invention. The present invention includes, but is not restricted to the embodiment in FIG. 3.

If the second signal in FIG. 3 has characteristics similar to the first signal, the second signal does not have to be "much weaker" than the first signal for the present invention to function because adaptive array 30 can use the energy in the second signal along with the first signal to adapt the weights to the proper values to reduce multipath.

In the case where first signal has a code or training signal that the adaptive array 30 can lock onto, then the power of second radio signal doesn't have to be much small than the power of the first signal. The power level of the second signal is limited to the ability of the first signal to lock on the code or training signal in its presence and successfully reduce first signal multipath and other interference.

The separation of the signals does not have to be an explicit separator, such as separator 20 in FIG. 3, it can be implicit in the receiver for some cases. For example, if the second signal is so much smaller than the first signal, the receiver of the first signal can suppress the second signal, or if the distortion caused by the second signal is not noticeable, the second signal does not have to be separated explicitly. A combination explicit separation for one signal and implicit separation the other signal can be used. Some signals can be both explicitly and implicitly separable.

The invention represented by FIG. 3 can be implemented at RF, IF, or baseband. The bandwidths of bandpass filter 22, receiver 12 and receiver 14 can be different.

Figure 4:
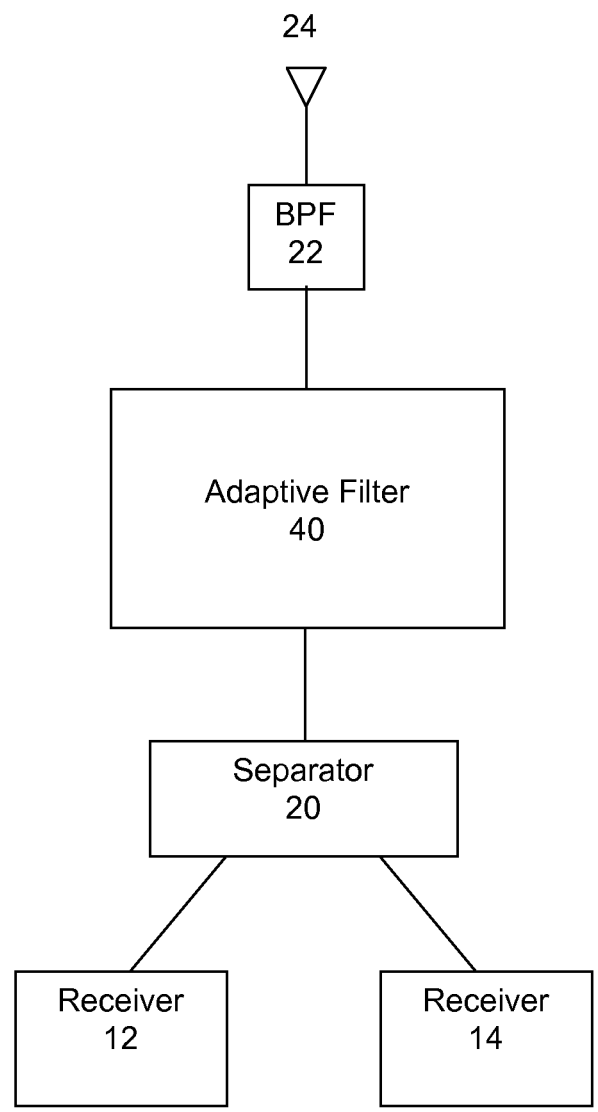
FIG. 4 shows a block diagram of an adaptive filter embodiment of the present invention.

FIG. 4 shows another embodiment of the present invention. FIG. 4 is the same as FIG. 3 except that the adaptive array 30 is replaced by adaptive filter 40 and the antenna 24 with N array elements is replaced by antenna 24 with a single element. The antenna 24 in FIG. 4 is coupled to the input terminal of bandpass filter 22. The output terminal of bandpass filter 22 is coupled to the input terminal of adaptive filter 40. The adaptive filter 40 reduces multipath and other interference. Except for adaptive filter 40 replacing adaptive array 30, FIG. 4 works like FIG. 3 to reduce multipath and interference in the first and second signals.

The present invention can be implemented for more than one processed secondary signal through the adaptive array or filter controlled by the first signal.

Figure 5:
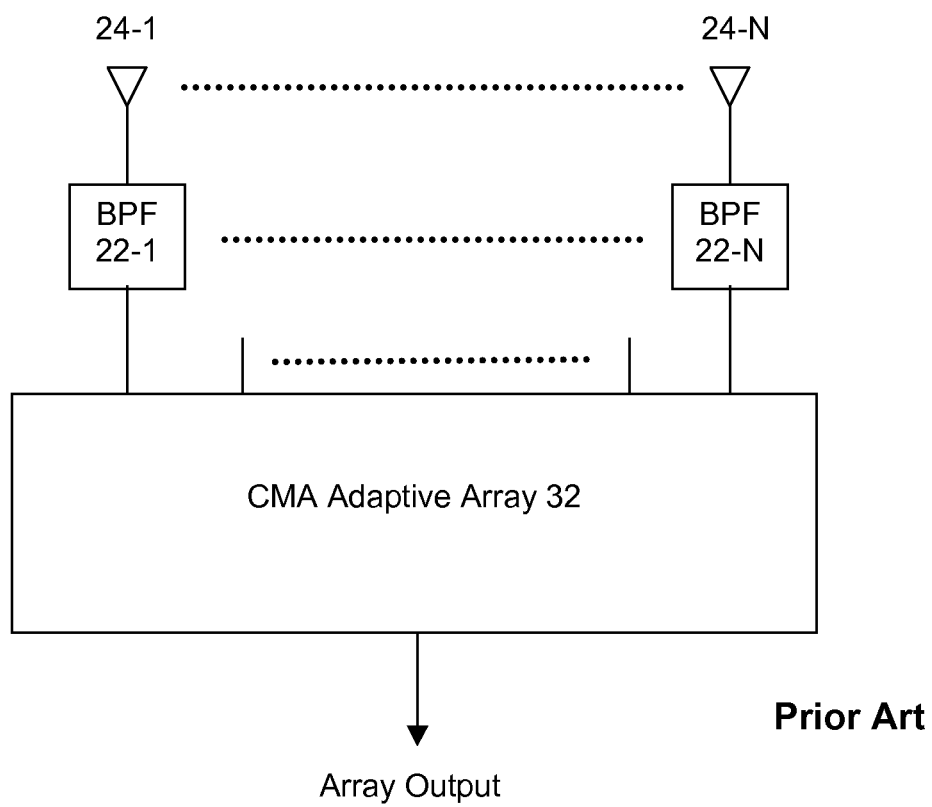
FIG. 5 shows block diagram of a prior art CMA adaptive array.

FIG. 5 shows a prior art CMA adaptive array 32, which can be used to reduce multipath in FM radio and other type signals (examples in U.S. Pat. Nos. 4,797,950 and 5,608,409 by Kenneth Rilling and Agee, Brian, "The Least-Squares CMA: A New Technique for Rapid Correction of Constant Modulus Signals, ICASSP 86 Proceedings, Vol 2, Pp. 19.2.1-19.2.4). For broadcast FM radio, the CMA adaptive array adjusts the weights to reduce multipath.

Figure 6:
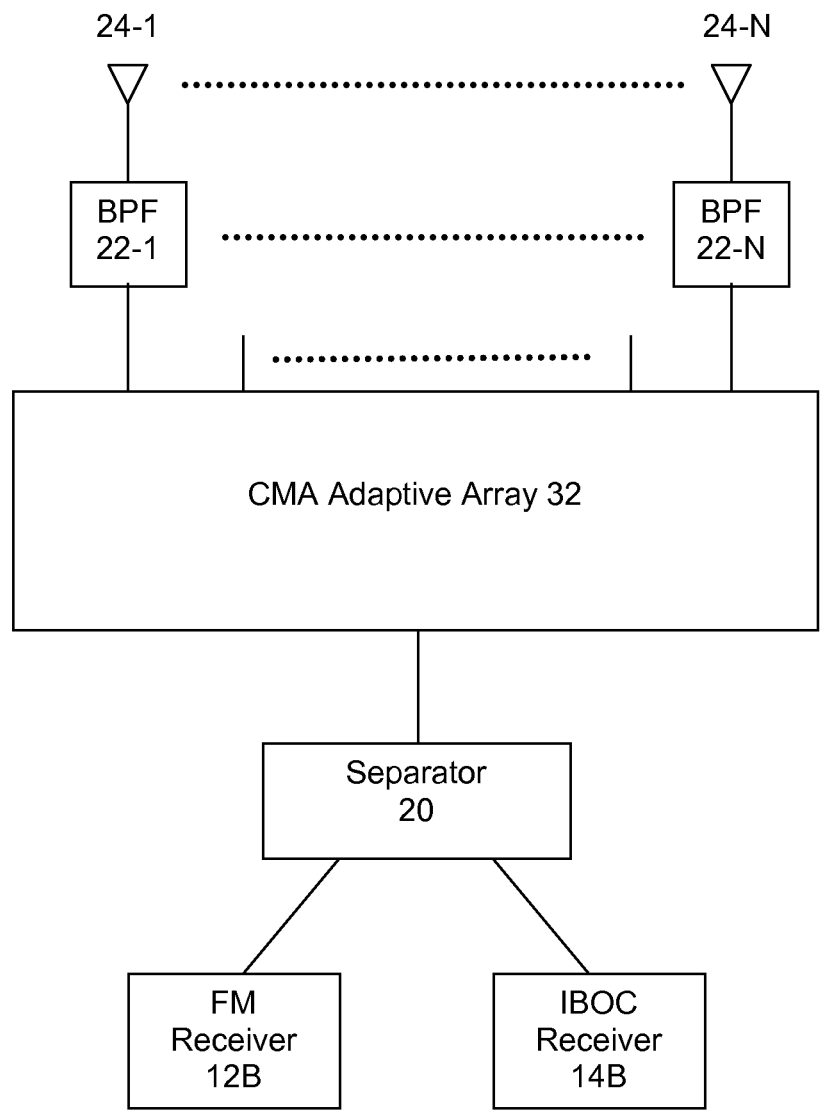
FIG. 6 shows a block diagram using a CMA adaptive array for application to an IBOC system for Broadcast FM.

FIG. 6 shows an embodiment of the present invention which functions like FIG. 3 for On-Channel, In-Band Digital Audio Radio (IBOC). As found in the prior art, IBOC has been developed to transmit a digital audio radio signal in the same allotted frequency space as used by a broadcast FM radio station with the analog FM signal. In some prior art IBOC systems, different types of multi-carrier modulated signals are transmitted with the analog FM signal with power significantly less than the analog FM signal, so it does not cause interference with the analog FM signal, etc. (i.e. 25 dB). Multi-carrier modulated signals include orthogonal frequency division multiplex (OFDM) and spread spectrum multi-carrier. In a recent version of IBOC, the digital signal is an OFDM signal. It is advantageous to use only one adaptive array at the receiving end to improve both signals instead of a separate adaptive array for each signal for cost and space reasons.

FIG. 6 is like FIG. 3, except that the adaptive array 30 is replaced by a CMA adaptive array 32 that can reduce multipath in an analog FM radio signal. In an IBOC system, the first signal is the analog FM signal and the IBOC signal is the second signal. The CMA adaptive array 32 adjusts its weights to reduce multipath by using primarily the analog FM signal because it is much stronger than the IBOC signal. CMA adaptive array 32 reduces multipath in both the analog FM and the digital signal. Receiver 12B is an analog FM receiver for Broadcast FM radio. Receiver 14B is a receiver for IBOC digital signal.

In FIG. 6, if an interference signal (other than multipath), which is stronger than the digital signal but weaker than the analog FM signal, is received, the CMA adaptive array 32 will reject the interference signal for both the FM signal and the IBOC signal. This can be a great advantage to the digital signal, because a very strong adjacent channel signal can create interference that is significantly stronger than the digital signal. Similarly, co-channel interference that is greater than the digital signal can occur. FIG. 6 is another embodiment of the present invention. The present invention includes, but is not restricted to the embodiment in FIG. 6.

Figure 13:
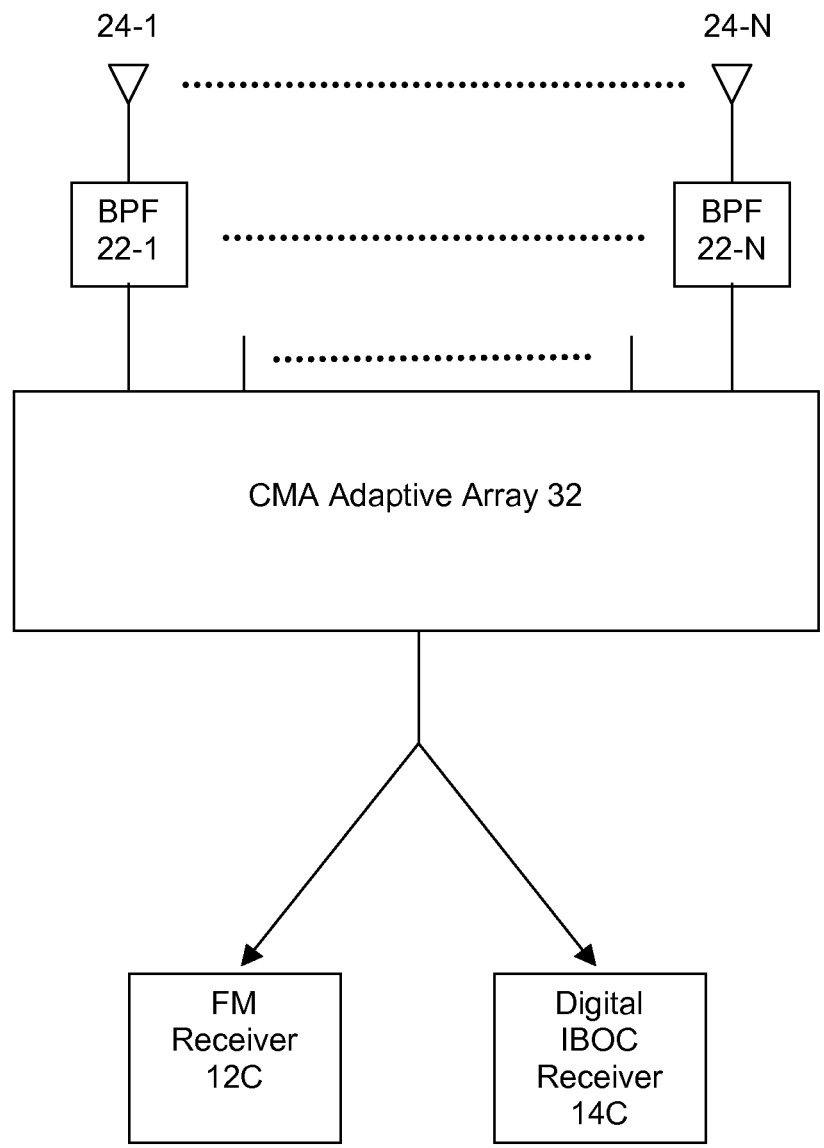
FIG. 13 shows a block diagram using a CMA adaptive array for application to an IBOC system for Broadcast FM with separation of signals implicit in receivers.

FIG. 13 shows another embodiment of the present invention where explicit separation of signals by a separator 20 is not necessary because the receivers can perform the separation function implicitly. FIG. 13 is like FIG. 6, except that receivers 12B and 14B are replaced by receivers 12C and 14C, where receivers 12C and 14C perform the separation function of separator 20 implicitly. Also, FIG. 13 is different from FIG. 6 because the CMA adaptive array output terminal is coupled to the input terminals of both receivers 12C and 14C, instead of the input terminal of separator 20. Receiver 12C uses the ability of FM to suppress interference to separate the desired FM signal from the digital signal by viewing the digital signal as a weak interference signal and suppressing it. Similarly, receiver 14C may view the FM signal as an interference signal, where the digital signal is a random sequence spread spectrum type multi-carrier signal and receiver 14C applies correlation with digital codes to extract the desired digital signal and suppress the FM signal. The separation here is implicit, and no explicit separator is needed. The separation is then part of the receiver processing. The present invention includes, but is not restricted to this example of an implicit separator.

Figure 7:
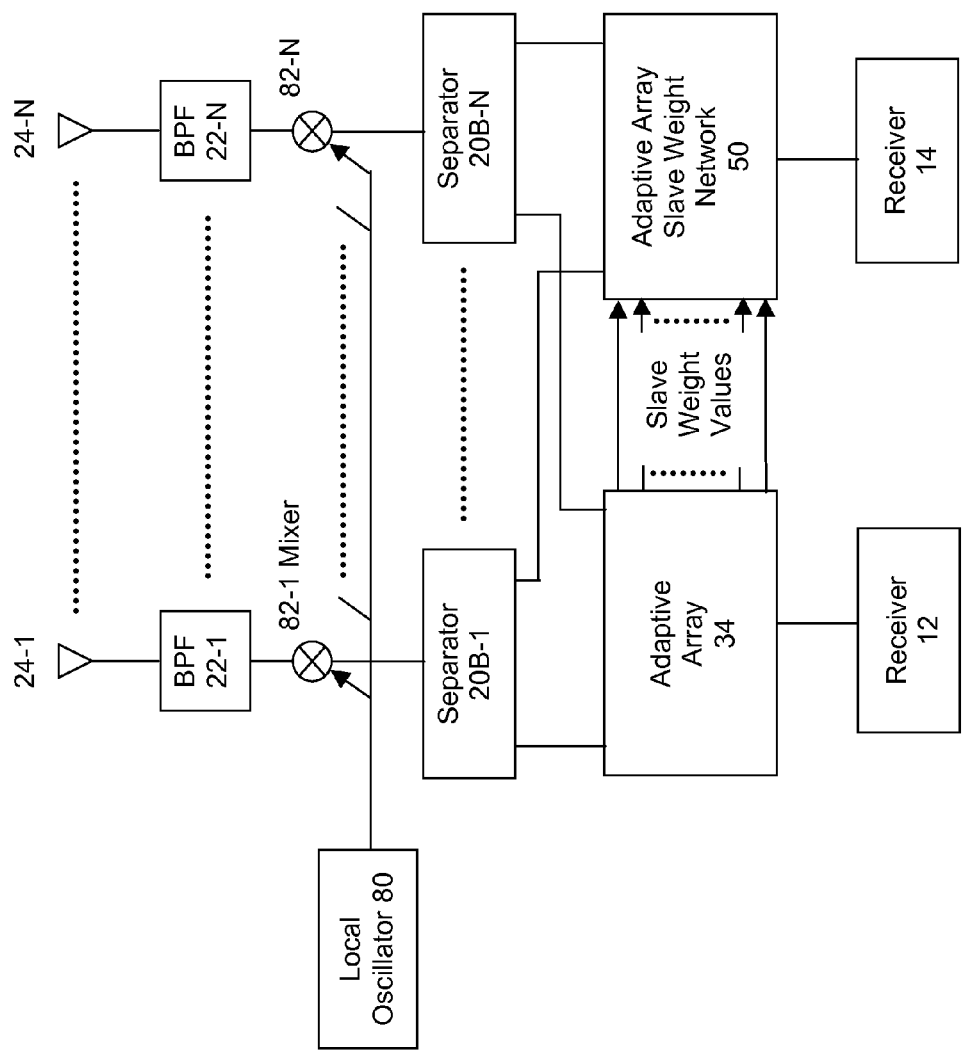
FIG. 7 shows a block diagram showing an adaptive array slave weight network.

In FIG. 7 shows another embodiment of the present invention. The signals are received at the elements of the antenna array 24, as in FIG. 3. The input terminal of each bandpass filter 22-$x$ is coupled the associated antenna element 24-$x$. The first input terminal of each mixer 82-$x$ is coupled to the output terminal of the associated bandpass filter 22-$x$, and the second input terminal of each mixer 82-$x$ is coupled to the output terminal of local oscillator 80 to down convert the received signals of each antenna element 24-$x$ to a convenient frequency at IF. The output terminal of each mixer 82-$x$ is coupled to the input terminal of the associated separator 20B-$x$, which separates the first signal from the second signal. Separator 20B-$x$ separates signals explicitly. The first output terminal of each separator 20B-$x$ is coupled to the associated input terminal of the adaptive array 34 to deliver the separated first signal. Adaptive array 34 can be any appropriate adaptive array implementation for the first signal. The second terminal of each separator 20B-$x$ is coupled to the associated input of the adaptive array slave weighting network 50 for the second signal. Adaptive array slave weighting network 50 is discussed below. The slave weight value output terminals of adaptive array 34, one for each weight, are coupled to the associated slave weight value input terminals of adaptive array slave weighting network 50. The array output terminal of adaptive array 34 is coupled to the input terminal of receiver 12 for receiving the first signal. The output terminal of adaptive array slave weight network 50 is coupled to input terminal of receiver 14 for receiving the second signal.

In FIG. 7, the adaptive array 34 reduces the multipath in the first signal to improve the performance of the first signal receiver 12. The weight values generated by the weights of adaptive array 34 are the same weight values required by the second signal to reduce multipath or other interference and are applied to the corresponding slave weights of adaptive array slave weighting network 50. The weight values of adaptive array slave weighting network 50 are slaved to the values of the associated weights of adaptive array 34 (discussed below) to reduce multipath and/or other interference in the second signal. The output terminal of adaptive array slave weighting network 50 is coupled to the input terminal of receiver 14 to receive the second signal. The embodiment of the present invention in FIG. 7 improves the performance of receiver 14. Since adaptive array 34 is designed to work with the first signal, the weights are adjusted to reduce multipath and/or other interference in the first signal, which are the weight values to reduce multipath and/or other interference in the second signal via the adaptive array slave weighting network 50. FIG. 7 reduces multipath or other interference in the second signal whether the second signal is stronger or weaker than the first signal.

In the case where separators 20B-x use bandpass and/or bandstop filtering to separate the first and second signals, not all other interference signals are shared by the first and second signals. Shared other interference signals having the direction of arrival as rejected multipath components of the first signal and other interference signals associated with the first signal are reduced by the slave weight network.

The present invention can be implemented in FIG. 7 at RF, IF, or baseband, as appropriate. Similarly, an adaptive filter with receiving antenna 24 with a single element can be used instead of an adaptive array 34 and a corresponding replacement of adaptive array slave weighting network 50 with an adaptive filter slave weighting network in FIG. 7 similar to what was shown in FIG. 4.

Equivalent to using only one antenna to transmit both first and second radio signals is to use two similar antennas that are located close enough to each other so that there is no significant difference in the transmission and propagation characteristics of the transmitted radio signals, just as the two radio signals transmitted from a signal antenna discussed above. Similarly, two similar receiving antenna arrays located close enough so there is no significant difference in the transmission, propagation and reception characteristics of the first and second received signals is equivalent to the single antenna array discussed above.

The adaptive arrays 30 and 34 in FIGS. 3 and 7 respectively can be any adaptive array implementation that can reduce multipath or other interference in the first signal with the information available for the specific application. References given above give examples of adaptive array and adaptive filter requirements. FIG. 5 gives the CMA adaptive array 32 that can be used for FM broadcast radio (and other certain modulation types) to reduce multipath. Similarly, the adaptive filter 40 in FIG. 4 is an adaptive filter that is appropriate for the specific application for reducing multipath and/or interference with the information available for its specific application.

Figure 8:
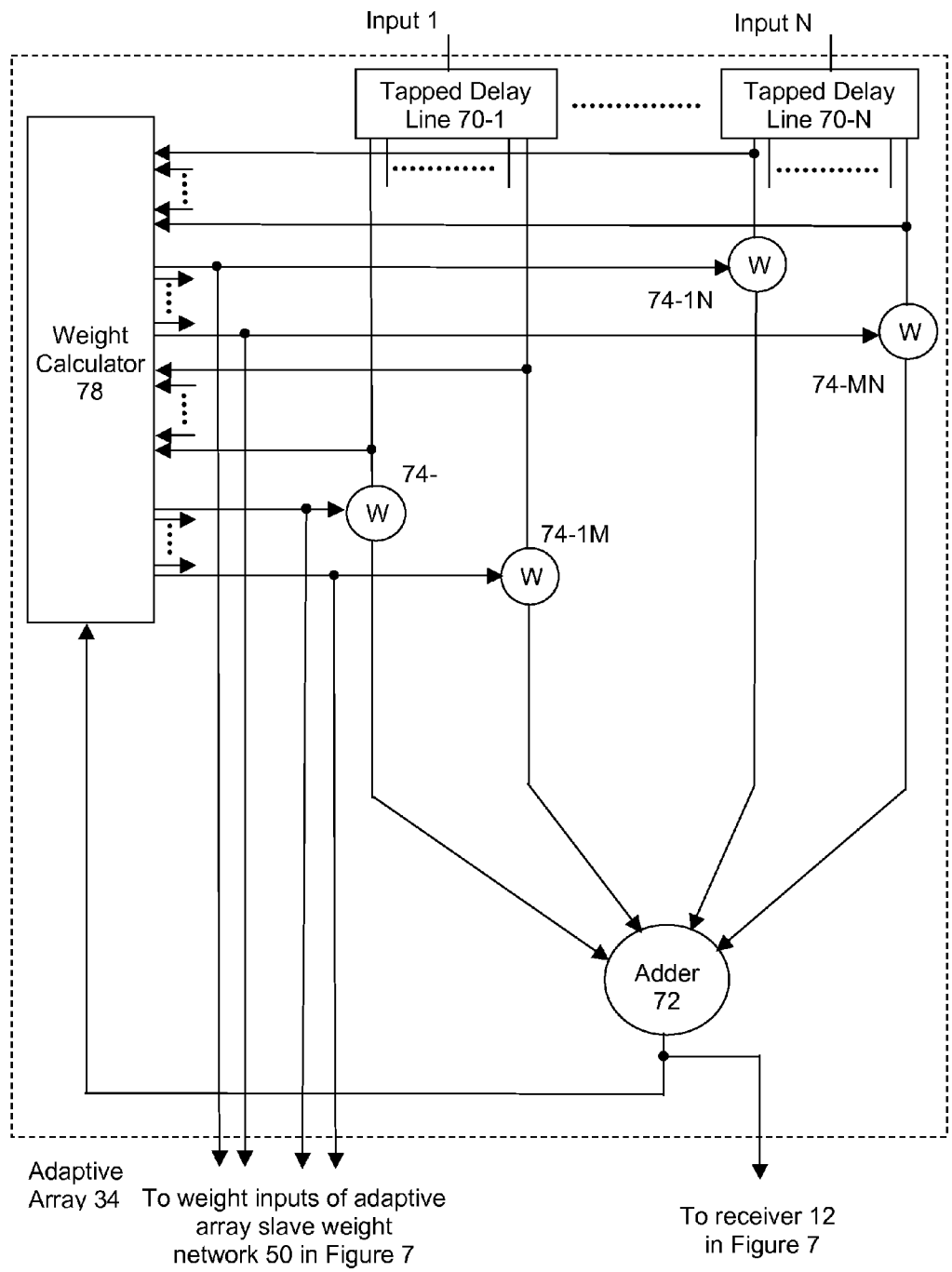
FIG. 8 shows a block diagram for the adaptive array for the adaptive array slave weight network embodiment.

FIG. 8 shows an adaptive array 34. In adaptive array 34, each weight value is applied to an associated slave weight output terminal for slaving the associated weights of the adaptive array slave weight network 50. Adaptive array 34 is any adaptive array with linear combiner weight implementation. The N inputs to the adaptive array are coupled the input terminal of a different one of the N the tapped delay line 70-$x$ (two outputs can have an equivalent 90 degree phase shift when appropriate). Each of the M output terminals of each tapped delay line 70-$x$ is coupled to the first input terminal of the associated weight 74-$yz$. The weight value is calculated in weight calculator 78 for each weight and is applied to the second input terminal of the associated weight 74-$yz$ and the associated output terminal for each slave weight of the adaptive array slave weighting network 50. Each weight 74-$yz$ output terminal is coupled to a different input terminal-$yz$ of adder 72 to sum the weighted signals. The output terminal of adder 72 is coupled to receiver 12 and weight calculator 78.

Similarly, an adaptive filter embodiment of the present invention is identical to adaptive filter 40 in FIG. 4 except the value of each weight is applied to an associated slave weight output terminal to slave the associated weight of the adaptive filter slave weight network.

Figure 9:
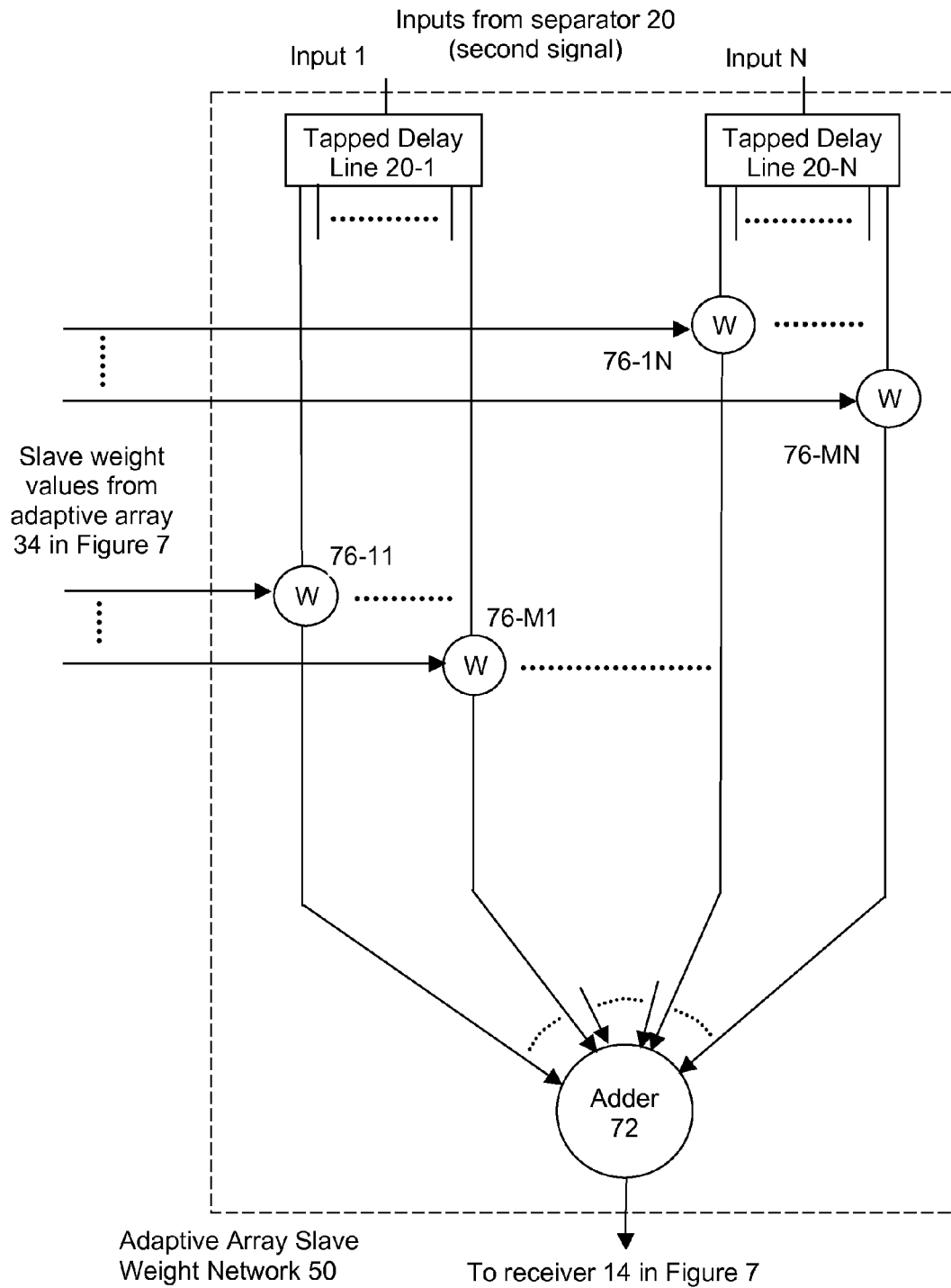
FIG. 9 shows the adaptive array slave weight network 50 for the slave weight network embodiment.

FIG. 9 shows the adaptive array slave weight network 50, which is the slave weight counterpart of adaptive array 34. The first input terminal of each weight 76-$yz$ is coupled to the second output terminal of the associated separator 20-$x$ in FIG. 7. The second input terminal of each weight 76-$yz$ is coupled to the output terminal of the associated slave weight output terminal of adaptive array 34 in FIG. 7 to control the weight value. The output signal of each weight 76-$yz$ is coupled to an input terminal of adder 72 that adds all the weighted signals. The output terminal $yz$ of adder 72 is coupled to the input terminal of receiver 14.

The weights of the adaptive array 34 and associated adaptive array slave weights of network 50 includes, but are not restricted to linear combiner forms of weights. In FIG. 7 the weight structure of adaptive array slave weighting network 50 mirrors the weight structure of the associated adaptive array 34.

The adaptive filter slave weight network is similar to the adaptive array slave weight network and mirrors the structure of the associated adaptive filter 40.

In signal combiner 6A and 6B of FIGS. 1, 2 and 12, the first, second, etc. signals are combined in such a way that they can be separated at the receiving end by separators 20, 20A, or implicitly in the receivers, which compliments the combining technique of signal combiners 6A and 6B. Various techniques can be used. Some examples which are well known in the art are as follows: 1) Two signals can be combined in quaderature. The quaderature characteristics are then exploited at the receiving end to separate the two signals. 2) The signals can occupy different frequency bands in the channel. Frequency band selective filters can separate the signals at the receiving end. 3) Random sequences can be applied to each signal before combining so that the signals are spread, and correlation of the each random sequence is applied at the receiving end to extract the signals, as found in the spread spectrum prior art. 4) Two signals can be combined in a way that the receiver of the first signal suppresses the second signal without having to explicitly remove the second signal. For example, a strong first signal that is FM can suppress a much weaker second signal without explicitly removing the second signal. Similarly, if the weak second signal is a spread spectrum signal, the second receiver can pull the second signal out without explicitly separating the first signal if it can achieve lock. Combinations of the methods can also be used. The present invention includes, but is not restricted to these examples of combining methods and separation methods of signals.

The receivers 12, 14, etc. are receivers that extract the intelligence of the received signals that are appropriate for each signal.

When multipath is present, this invention applies only to those adaptive array and multiple signal applications where the same weight values and associated antenna pattern of the adaptive array is appropriate for rejecting multipath interference for all the signals of interest.

It would be clear to a person skilled in the art that the present invention can be implemented in analog, digital, analog/digital hybrid, software/digital, etc., also as partially illustrated below.

Figure 10:
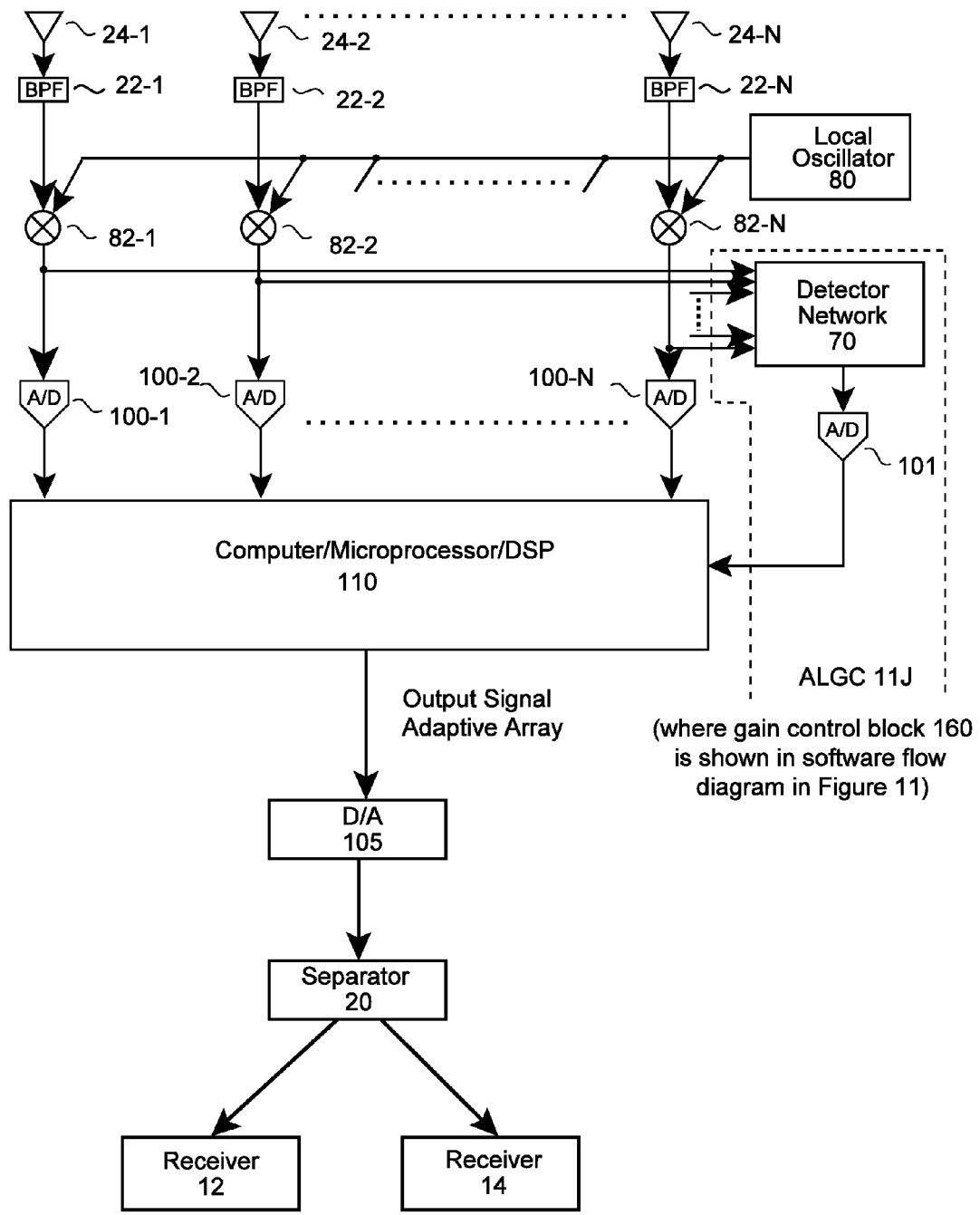
FIG. 10 shows a block diagram for a digital embodiment.
Figure 11:
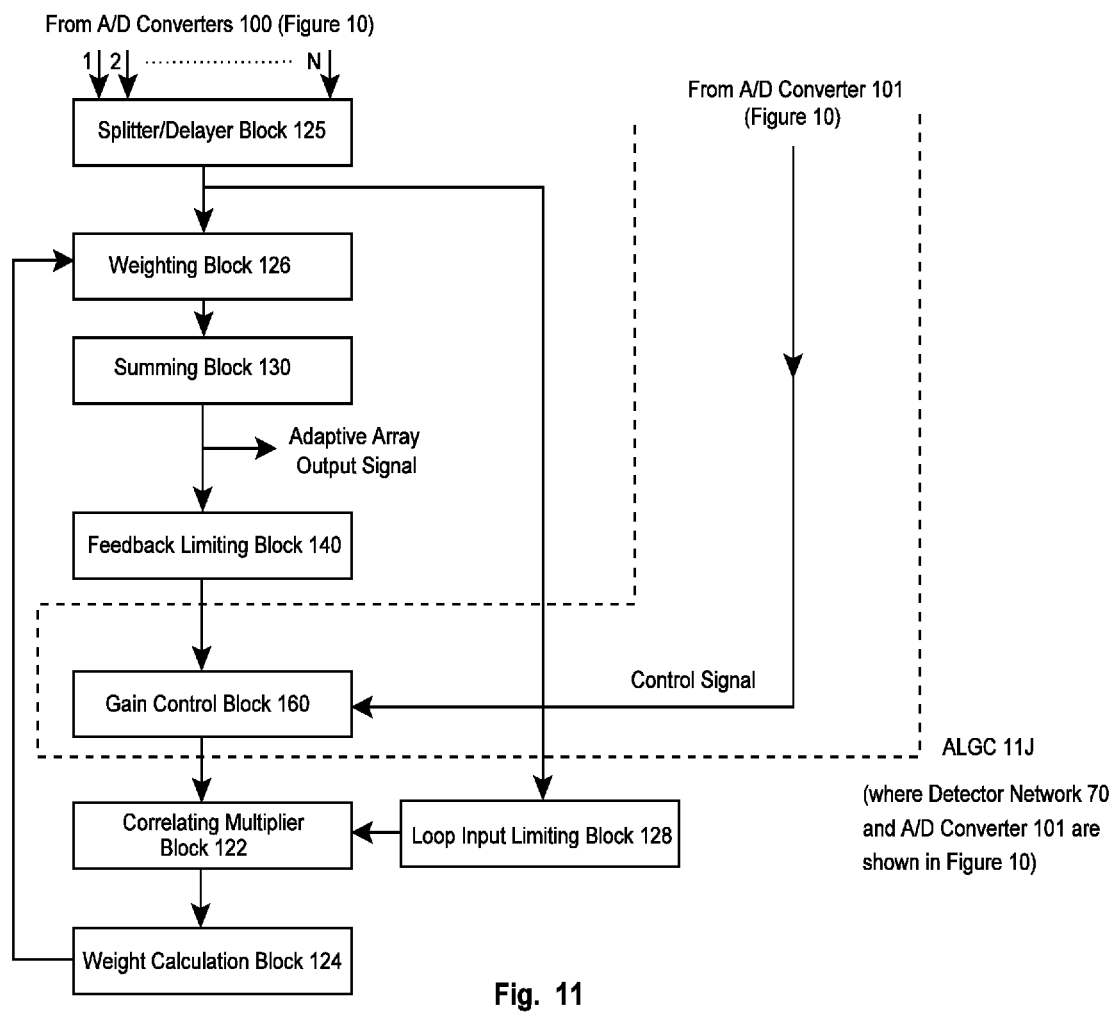
FIG. 11 shows a software flow block diagram for a digital embodiment.

FIG. 10 shows the present invention implemented with the use of a computer, microprocessor, or digital signal processors (DSP) 110. The embodiment of the present invention in FIG. 10 and the corresponding software flow diagram in FIG. 11 are similar to those found in U.S. Pat. No. 5,608,409 by Kenneth Rilling, except the input data that it operates on contains representations of the first and second radio signals.

As in the analog embodiments of the present invention, the first signal, second signal, multipath signals and other interference signals are received by the N elements of antenna 24 with each antenna element coupled to the input terminal of a corresponding bandpass filter 22-$x$. In turn, the output terminal of each bandpass filter 22-$x$ is coupled to the first input terminal of a corresponding mixer 82-$x$. The second input terminal of each mixer 82-$x$ is coupled to output terminal of local oscillator 80. The output terminal of each mixer 82-$x$ is subsequently coupled to a corresponding input terminal of detector network 70 and the input terminal of a corresponding analog-to-digital (A/D) converter 100-$x$, where the output port of each A/D converter in turn is coupled to the corresponding input port of computer/microprocessor/DSP 110. The output terminal of detector network 70 is coupled to the input terminal of A/D converter 101, the output port of which is in turn is coupled to the corresponding input port of computer/microprocessor/DSP 110. The adaptive array algorithm for a specific embodiment of the present invention is implemented in the computer/microprocessor/DSP 110, an example of which is discussed below. The output port of computer/microprocessor/DSP 110 is coupled to the input port of D/A converter 105 to convert the digital representation of the adaptive array output signal to an analog signal. The output terminal of D/A converter 105 is coupled to the input terminal of separator 20. The first and second output terminals of separator 20 are coupled to the input terminals of receivers 12 and 14 respectively to receive the first and second signals respectively.

FIG. 11 shows a flow chart for a software embodiment of the adaptive array of the present invention shown in FIG. 6 which is a specific constant modulus implementation of the adaptive array algorithm to compute each weight value, however, the software embodiment of the present invention is not limited to the embodiment presented below. The mathematical relationships for implementing the software is given in U.S. Pat. No. 5,608,409 by Kenneth F. Rilling where they are explained and discussed. At least one software embodiment is possible for each of the various embodiments of the present invention provided above.

In FIG. 11, each of the digitized antenna element signals from A/D converters 100-$x$ goes to splitter/delayer block 125. The splitter/delayer block 125 makes M copies (one for each adaptive loop) of the incoming data from each A/D converter 100-$x$, delaying each of the M copies an appropriate length of time such that it functions as the software equivalent of an M output tapped delay line. The splitter/delayer block 125 output goes to loop input limiting block 128 and weighting block 126.

Loop input limiting block 128 computes the input signal level (i.e. envelope) for each antenna element and then computes the amplitude limited signal for each adaptive loop by applying the following calculation:

$$L_i(n)=X_i(n)/|X_i(n)| \qquad \text{eq}(1)$$

where i refers to the "i"th adaptive loop, n refers to the "n"th time sample, and $X_i$ the input signal of the ith loop. The output of loop input limiting block 128 goes to the correlation multiplier block 122.

Weighting block 126 weights each adaptive loop input signal, starting with an initial weighting value, by making the following calculation for each adaptive loop:

$$S_i(n)=X_i(n)*W_i(n) \qquad \text{eq}(2)$$

where $W_i$ is the weight of the "i"th adaptive loop. The output of weighting block 126 goes to the summing block 130.

Summing block 130 sums the weighted values of all the input signals of all the adaptive loops using the following calculation:

$$S_t(n)=\Sigma S_i(n) \qquad \text{eq}(3)$$

The output data of summing block 130 goes to feedback limiting block 140. The output of summing block 130 also provides the output signal of the adaptive array which can be used in its digital form in a digital receiver, etc. or be applied to a digital-to-analog converter, as appropriate.

Feedback limiting block 140 computes the adaptive array output signal level and then the amplitude limited version of the adaptive array output signal, as follows:

$$\epsilon(n)=S_t(n)/|S_t(n)| \qquad \text{eq}(4)$$

The output data of feedback limiting block 140 goes to the gain control block 160.

The gain control block 160 computes the amplitude of the feedback signal using the following equation:

$$\epsilon_c(n)=\alpha*D(n)*\epsilon(n) \qquad \text{eq}(5)$$

where D(n) is the gain of gain control block 160 as determined by the input signal level of the adaptive array, detector network 70 (FIG. 10), and gain control block 160, and $\alpha$ is a constant. The output of gain control block 160 goes to correlation multiplying block 122.

Correlating multiplier block 122 multiplies the amplitude limited input for each adaptive loop calculated in the loop input limiting block 128 with the feedback signal as follows:

$$M_i(n)=\epsilon_c(n)*L_i(n) \qquad \text{eq}(6)$$

The output of correlation multiplying block 122 is applied to weight calculating block 124 which computes the next weighting value for each weight using the following equation:

$$W_i(n+1)=W_i(n)+M_i(n) \qquad \text{eq}(7)$$

where this new value of each weight is used to update each weight value for calculation of the next data sample. This process continues for each successive data sample with the weights converging to steady state values.

AGLC 11J (described in U.S. Pat. No. 5,608,409 by Kenneth Rilling) is made up of detector network 70 and A/D converter 101 in FIG. 10 and gain control block 160 in FIG. 11. This software embodiment of the present invention in FIGS. 10 and 11 functions in a manner similar to its analog counter part in FIG. 6.

The computer, microprocessor, or digital signal processors (DSP) 110, software design, A/D converters 100 and 101 in FIG. 10, and any associated digital-to-analog converter for the adaptive array output signal are chosen so that they can function in real time for the specific adaptive array application to which it is applied.

This is only one example software/digital embodiment of the present invention. The present invention includes, but is not restricted to this example.

From the foregoing description, it will be apparent that the invention disclosed herein provides novel and advantageous performance improvements for receiving separable signals which are transmitted from the same antenna and received by the same antenna for the adaptive array. It will be understood by those familiar with the art, the invention may be embodied in other specific forms without departing from the spirit or essential characteristics thereof.

What is claimed:

1. Apparatus for processing K received signals, the apparatus comprising:
    a signal shifter for an input signal configured to generate one or more shifted output signals that are shifted versions of the input signal, the shifted output signals include respective time delay shifts or respective phase shifts, each time delay shift is at least zero, each phase shift magnitude is at least zero, the input signal is derived from the K received signals, K is at least 2, each of the K received signals was transmitted separately from a different one of K transmit antennas at a common transmitter end, each of the K transmitted signals were formed by transmitting a different representation of a common signal in a common frequency channel, the common signal is made up of an at least one first signal and an at least one second signal, and
    an at least one adder configured to generate an adder output signal that is a function of the sum of the products of i) each of the associated shifted output signals with ii) a respective one of a plurality of weights associated with that shifted output signal, the plurality of weights being determined in such a way as to reduce interference in a particular type of signal that the apparatus was designed to process.

2. Apparatus as in claim 1, further comprising at least one separator that is configured to retrieve at least one signal of the at least one first signal and the at least one second signal from the adder output signal.

3. Apparatus as in claim 2, further comprising at least one weight generator that repetitively determines each one of the plurality of weights based on i) the associated shifted output signal, and ii) the associated adder output signal, the determination of the plurality of weights is such that the weights converge to substantially a steady state.

4. Apparatus as in claim 2, wherein a weight generator determines the plurality of weights based on propagation characteristics of one or more of the first signals of the representations of the at least one first signal of the common signal.

5. Apparatus as in claim 2, wherein the K received signals include at least one training signal, so that a weight generator determines the plurality of weights based on at least the one training signal.

6. Apparatus as in claim 2, wherein each one of the representations of the at least one first signal of the common signal includes at least one training signal, so that the determination of the plurality of weights is carried out based on one or more training signals of one or more of the at least one training signals.

7. Apparatus as in claim 2, wherein the common signal is at least part of a multi-carrier signal.

8. Apparatus as in claim 7, wherein the multi-carrier signal includes an orthogonal frequency division multiplex signal.

9. Apparatus as in claim 2, wherein the apparatus includes a digital processor, and wherein at least the plurality of weights are determined using the digital processor.

10. Apparatus as in claim 2, wherein each of the plurality of weights is an analog weight.

11. Apparatus for processing two received signals, the apparatus comprising:
    a signal shifter for an input signal configured to generate one or more shifted output signals, the shifted output signals including respective time delay shifts or respective phase shifts, each time delay shift being at least zero, each phase shift magnitude being at least zero, the input signal is derived from the two received signals, the two received signals were each transmitted separately from a different one of two transmit antennas at a common transmitter end, the two transmitted signals having been formed by transmitting separately an A first signal and zero or more A second signals from one antenna and a B first signal and an at least one B second signal from the other antenna that are in a common frequency channel, and
    two adders each configured to generate a separate adder output signal, each adder output signal is a function of a separate sum of the associated products of i) each of the associated shifted output signals of that adder with ii) a respective one of a plurality of weights associated with that shifted output signal and that adder, the plurality of weights being determined in such a way as to reduce interference in a particular type of signal that the apparatus was designed to process, the zero or more A second signals and the at least one B second signal are similar enough to the A first signal and the B first signal so that the zero or more A second signals and the at least one B second signal are used with the A first signal and the B first signal in the determination of the plurality of weights.

12. Apparatus as in claim 11, wherein a weight generator determines the plurality of weights based on propagation characteristics of the A first signal and the B first signal.

13. Apparatus as in claim 11, wherein the two received signals each include at least one training signal, so that a weight generator determines the plurality of weights based on one or more of each one of the at least one training signals.

14. Apparatus as in claim 11, wherein the A first signal and the B first signal each include at least one training signal, so that a weight generator determines the plurality of weights based on one or more of each of the at least one training signals.

15. Apparatus as in claim 11, wherein the A first signal, the zero or more A second signals, the B first signal, and the at least one B second signal are at least part of a multi-carrier signal.

16. Apparatus as in claim 15, wherein the multi-carrier signal includes an orthogonal frequency division multiplex signal.

17. Apparatus as in claim 11, wherein the A first signal and the B first signal were transmitted at substantially the same time, and separately the zero or more A second signals and the at least one B second signal were transmitted at substantially the same time.

18. Apparatus as in claim 11, wherein the A first signal, the B first, the zero or more A second signals, and the at least one B second signal were transmitted at substantially the same time.

19. Apparatus as in claim 11, wherein each of the plurality of weights is an analog weight.

20. Apparatus for processing at least two received signals, the apparatus comprising:

a signal separator for an input signal configured to generate a first separated signal and a second separated signal, the first separated signal includes an A first signal and a B first signal and the second separated signal includes zero or more A second signals and one or more B second signals of the two received signals, the input signal is derived from the two received signals, the two received signals were each transmitted separately from a different one of two transmit antennas at a common transmitter end, the two transmitted signals were formed by transmitting the A first signal and the zero or more A second signals from one of the two transmit antennas and transmitting the B first signal and the one or more B second signals from the other one of the two transmit antennas that are in a common frequency channel, a first adder configured to generate a first adder output signal that is a function of the sum of the products of i) separately each of a representation of the first separated signal and a representation of the second separated signal with ii) a respective one of a plurality of first weights associated with that one of the representation of the first separated signal and the representation of the second separated signal, the plurality of first weights being determined in such a way as to reduce associated interference in a particular type of signal that the apparatus was designed to process, the zero or more A second signals and the one or more B second signals are similar enough to the A first signal and the B first signal so that the zero or more A second signals and the one or more B second signals are used with the A first signal and the B first signal in the determination of the plurality of first weights, and a second adder configured to generate a second adder output signal that is a function of the sum of the products of i) separately each of the representation of the first separated signal and the representation of the second separated signal with ii) a respective one of a plurality of second weights associated with that one of the representation of the first separated signal and the representation of the second separated signal, each one of the plurality of second weights is derived from an associated one of the plurality of first weights.

* * * * *